United States Patent
Turner et al.

(10) Patent No.: US 8,803,731 B2
(45) Date of Patent: Aug. 12, 2014

(54) TARGET-TRACKING RADAR AND METHOD FOR RESPONDING TO FLUCTUATIONS IN TARGET SNR

(75) Inventors: Damon C. Turner, Tucson, AZ (US); Brett J. Young, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 676 days.

(21) Appl. No.: 13/075,299

(22) Filed: Mar. 30, 2011

(65) Prior Publication Data
US 2013/0328714 A1  Dec. 12, 2013

(51) Int. Cl.
G01S 13/72 (2006.01)
G01S 13/44 (2006.01)
G01S 13/68 (2006.01)

(52) U.S. Cl.
CPC ........... *G01S 13/4427* (2013.01); *G01S 13/685* (2013.01); *G01S 13/72* (2013.01)
USPC ............................... 342/90; 342/73; 342/165

(58) Field of Classification Search
USPC .......................................................... 342/90
See application file for complete search history.

(56) References Cited

U.S. PATENT DOCUMENTS

| | | | |
|---|---|---|---|
| 3,935,572 A * | 1/1976 | Broniwitz et al. | 342/80 |
| 3,952,304 A * | 4/1976 | Broniwitz et al. | 342/95 |
| 4,387,373 A * | 6/1983 | Longuemare, Jr. | 342/25 C |
| 4,533,916 A * | 8/1985 | Williams | 342/80 |
| 5,014,064 A | 5/1991 | Spencer et al. | |
| 5,049,888 A | 9/1991 | Prenat | |
| 5,400,035 A | 3/1995 | Liu | |
| 5,960,097 A | 9/1999 | Pfeiffer et al. | |
| 6,215,115 B1 * | 4/2001 | Baker et al. | 250/221 |
| 6,229,475 B1 | 5/2001 | Woolley | |
| 6,337,656 B1 | 1/2002 | Natsume et al. | |
| 6,930,633 B1 | 8/2005 | Epperson | |
| 7,132,977 B1 | 11/2006 | Pillai | |
| 7,330,149 B2 * | 2/2008 | Weatherford | 342/149 |
| 7,567,203 B2 * | 7/2009 | Dizaji et al. | 342/90 |

(Continued)

FOREIGN PATENT DOCUMENTS

| | | |
|---|---|---|
| DE | 112012001478 T5 | 12/2013 |
| DE | 112012001722 T5 | 1/2014 |

(Continued)

OTHER PUBLICATIONS

"International Application Serial No. PCT/US2012/023083, International Search Report mailed Sep. 7, 2012", 2 pgs.

(Continued)

*Primary Examiner* — Matthew M Barker
(74) *Attorney, Agent, or Firm* — Schwegman, Lundberg & Woessner, P.A.

(57) ABSTRACT

Embodiments of a target-tracking radar and methods for responding to fluctuations in target SNR are generally described herein. In some embodiments, the target-tracking radar may be configured to determine whether a target can be considered a point target based on the SNR of received signals and off-boresight error estimates. Measurement-variance estimates generated from the SNR are provided to a target-state estimator when the target is determined to be a point target. When the target is determined not to be a point target, the measurement-variance estimates generated from SNR are not used by the target-state estimator. This may allow targets to be engaged at increased range.

21 Claims, 2 Drawing Sheets

(56) References Cited

U.S. PATENT DOCUMENTS

| | | | |
|---|---|---|---|
| 7,825,848 B2* | 11/2010 | Schoettl | 342/62 |
| 2003/0085840 A1* | 5/2003 | Benner et al. | 342/450 |
| 2003/0189512 A1 | 10/2003 | Chen et al. | |
| 2006/0049978 A1 | 3/2006 | Siegel | |
| 2006/0220951 A1 | 10/2006 | Thome et al. | |
| 2010/0026559 A1 | 2/2010 | Siegel | |
| 2010/0079328 A1 | 4/2010 | Drake et al. | |
| 2013/0342384 A1 | 12/2013 | Young et al. | |

FOREIGN PATENT DOCUMENTS

| | | | | |
|---|---|---|---|---|
| JP | 03183982 A * | 8/1991 | | G01S 13/66 |
| JP | 2014514550 A | 6/2014 | | |
| JP | 2014514560 A | 6/2014 | | |
| WO | WO-2012/134620 A1 | 10/2012 | | |
| WO | WO-2012/141787 A1 | 10/2012 | | |

OTHER PUBLICATIONS

"International Application Serial No. PCT/US2012/023083, Written Opinion mailed Sep. 7, 2012", 7 pgs.

"International Application Serial No. PCT/US2012/025200, International Search Report mailed Sep. 21, 2012", 2 pgs.

"International Application Serial No. PCT/US2012/025200, Written Opinion mailed Sep. 21, 2012", 4 pgs.

Hughes, E. J., et al,, "Target manoeuvre detection using radar glint", *Electronics Letters*, 34(17), (1998), 1695-1696.

"International Application Serial No. PCT/US2012/023083, International Preliminary Report on Patentability dated Oct. 1, 2013", 8 pgs.

"International Application Serial No. PCT/US2012/025200, International Preliminary Report on Patentability mailed Oct. 24, 2013", 6 pgs.

U.S. Appl. No. 13/087,527, Notice of Allowance mailed Apr. 25, 2014, 8 pgs.

\* cited by examiner

TARGET-TRACKING RADAR AND METHOD FOR RESPONDING TO FLUCTUATIONS IN TARGET SNR

GOVERNMENT RIGHTS

This invention was made with United States Government support under Contract Number N00024-07-C-5437 with the Department of the Navy. The United States Government has certain rights in this invention.

TECHNICAL FIELD

Embodiments pertain to target-tracking radars including monopulse radars. Some embodiments relate to target glint detection. Some embodiments relate to tracking non-maneuvering targets including ballistic targets, such as munitions, mortars, rockets and missiles.

BACKGROUND

Target-tracking radars, such as monopulse radars, are configured to track targets by simultaneously transmitting a single radar pulse in two or more lobes and are able to obtain angle information from the single pulse. Target-tracking radars with sufficiently high bandwidth may inadvertently respond to noise in a target's epsilons (i.e., the off-boresight angles or error estimates). The noise may result from a reduction in a target's signal-to-noise ratio (SNR) which results in an increase in the variance of the measured epsilons. Natural target power fluctuations may also reduce a target's SNR further contributing to variance in the off-boresight angles. These factors reduce the ability of a target-tracking radar system to accurately track a target, and may further reduce the range at which targets may be engaged. For example, some conventional target-tracking systems may interpret SNR fades as a target maneuver, reducing the ability of the system to accurately track a target.

Thus what is needed is an improved target-tracking radar and methods for responding to fluctuations in target SNR. What is also needed is an improved target-tracking radar that is less susceptible to variations in a target's epsilons as well as less susceptible to SNR fluctuations. What is also needed is an improved target-tracking radar that can more accurately track a target and can engage targets at increased range.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
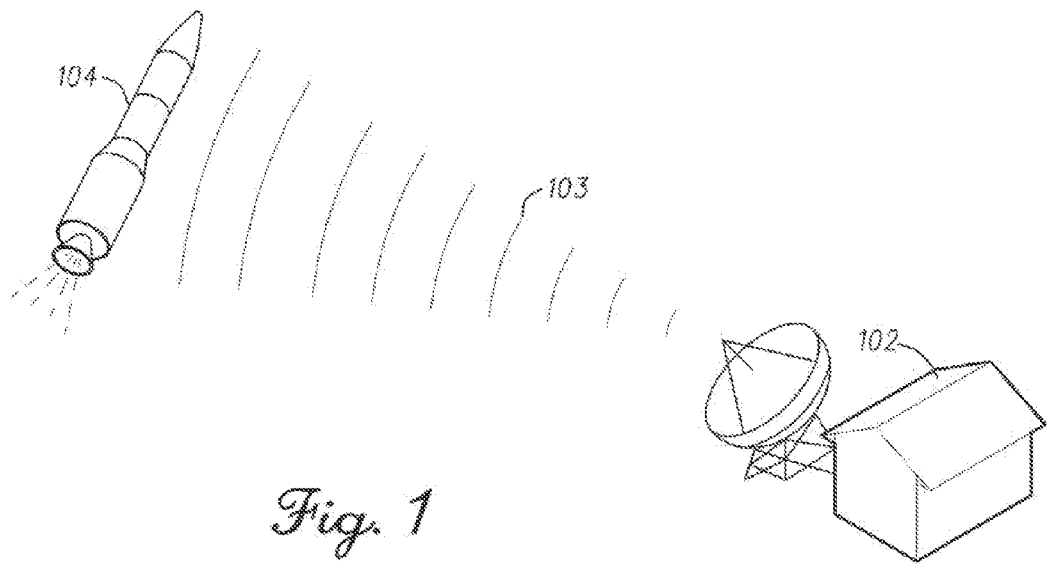
FIG. 1 illustrates the operation of a target-tracking radar in accordance with some embodiments.

FIG. 1 illustrates the operation of a target-tracking radar in accordance with some embodiments. Target-tracking radar 102 may be configured to track a target 104 based on the reception of reflected radar-return signals from the target 104. Target direction relative to boresight may be determined based on a comparison of the return signals.

In accordance with embodiments, the target-tracking radar 102 may be configured to determine whether the target 104 can be considered a point target based on the SNR of received signals and off-boresight error estimates. When the target 104 is determined to be a point target, measurement-variance estimates generated from the SNR may be used by a target-state estimator. When the target 104 is determined not to be a point target, measurement-variance estimates based on SNR are not used by the target-state estimator (i.e., the measurement-variance estimates used by the target-state estimator (e.g., a Kalman filter) may be a constant or based on filter residuals). These embodiments are described in more detail below.

In these embodiments, the use of the measurement-variance estimates by the target-state estimator for point targets allows the target-state estimator to more accurately respond to target power fluctuations that reduce the SNR of the return signals. This may improve the ability of the target-tracking radar 102 to track the target 104 improving pointing performance as well as increasing the range at which targets may be engaged. These embodiments are described in more detail below.

In some embodiments, the target-tracking radar 102 may be a monopulse radar and may be configured to track targets by simultaneously transmitting a single radar pulse in two or more lobes 103 to obtain angle information. In these embodiments, the return signals from each lobe are amplified separately and compared to each other, indicating which direction has a stronger return allowing the general direction of the target 104 relative to boresight to be determined. Since this comparison may be carried out during one pulse, changes in target position or heading will have little or no effect on the comparison.

In some embodiments, the target 104 may be a non-maneuvering target such as a ballistic target. The target 104, for example, may include a munition, a mortar, a rocket or a missile. The target-tracking radar 102 is configured to track a position of the target 104 at range. In some embodiments, the target-tracking radar 102 may be part of a land-based or ship-based missile defense system to detect, track and engage incoming rockets and artillery fire, although the scope of the embodiments are not limited in this respect as the target-tracking radar 102 may be used for tracking almost any target object.

Figure 2:
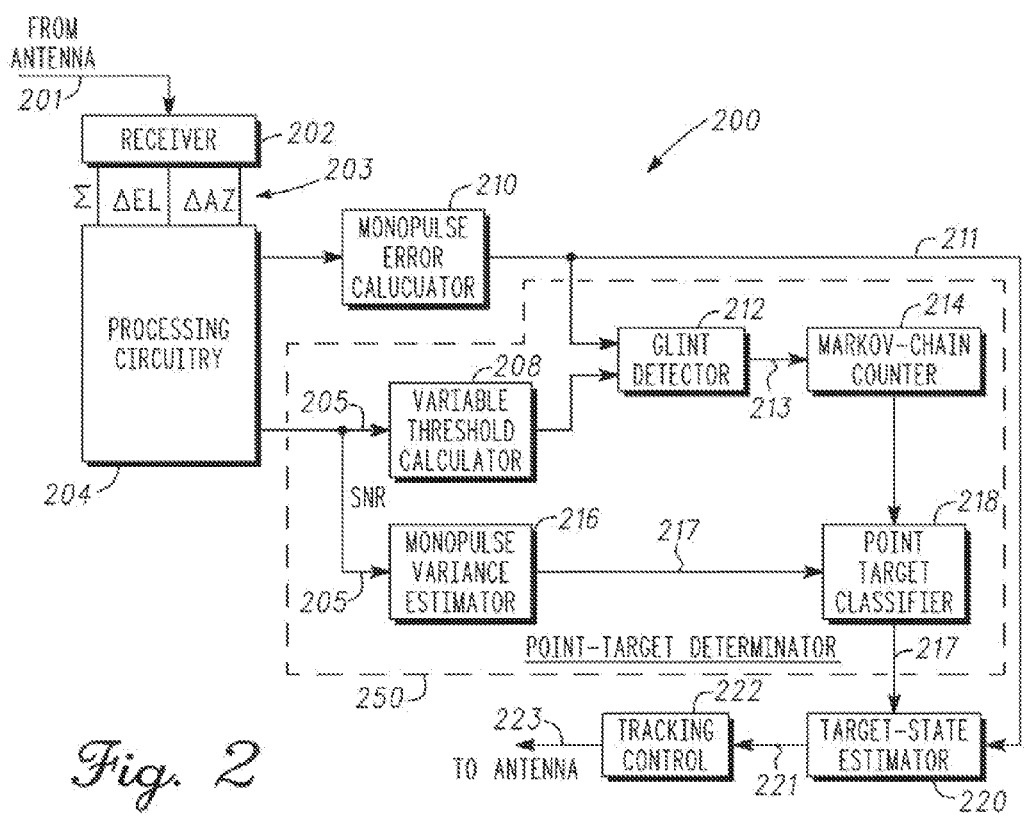
FIG. 2 is a functional block diagram of a target-tracking radar in accordance with some embodiments.

FIG. 2 is a functional block diagram of a target-tracking radar in accordance with some embodiments. The target-tracking radar 200 may be suitable for use as the target-tracking radar 102 (FIG. 1).

In accordance with embodiments, the target-tracking radar 200 may include a point-target determinator 250 configured to determine whether a target 104 (FIG. 1) can be considered a point target based on the SNR 205 of received signals 203 and based on off-boresight error estimates 211. The point-target determinator 250 may also be configured to provide measurement-variance estimates 217 generated from the SNR 205 to a target-state estimator 220 when the target 104 is determined to be a point target. The point-target determinator 250 may also be configured to refrain from providing the measurement-variance estimates 217 to the target-state estimator 220 when the target 104 is determined not to be a point target.

The target-tracking radar 200 may also include processing circuitry 204 to generate the SNR 205 based on the received signals 203 and one of a measured, estimated or predetermined noise level. The target-tracking radar 200 may also include a monopulse error calculator 210 to determine the off-boresight error estimates 211 based on the received signals 203.

The received signals 203 comprise a sum signal, an azimuth delta signal and an elevation delta signal. In some embodiments, the monopulse error calculator 210 may determine the off-boresight error estimates 211 based on a ratio of the sum and delta signals. The use of the sum and delta signals may allow target direction to be determined and may allow angular measurement from a single pulse. The sum signal may correspond with the antenna beam along center-line of the antenna. The delta signals may be generated from pairs of beams that are adjacent to the center-line of the sum antenna beam. In these embodiments, the off-boresight error estimates 211 generated by the monopulse error calculator 210 may be considered monopulse error and may be referred to as epsilons. In some embodiments, the monopulse error calculator 210 may be part of processing circuitry 204.

The target-tracking radar 200 may also include receiver 202 to generate the received signals 202 from radar-return signals 201. The radar-return signals 201 may be received through one or more antennas. In some embodiments, a single antenna with four or more horns may be used, although the scope of the embodiments is not limited in this respect.

In accordance with some embodiments, the point-target determinator 250 may include a variable-threshold calculator 208 to generate a variable threshold 209 based on the SNR 205, a glint detector 212 to compare the variable threshold 209 with the off-boresight error estimates 211, and a Markov-chain counter 214 to count a number of times that the off-boresight error estimates 211 exceed the variable threshold 209 based on an output 213 from the glint detector 212.

The variable threshold 209 may vary inversely proportional to the SNR 205 (i.e., when the SNR increases, the variable threshold decreases). The variable threshold 209 may be viewed as a prediction of the expected worst-case off-boresight error estimate for a point target. Measurement noise may be estimated as a variance (i.e., $\sigma^2$) of the measured boresight angles, referred to as the measurement-variance estimates 217.

In some embodiments, the output of the Markov-chain counter 214 may be a count of the number of times that the off-boresight error estimates 211 exceed the variable threshold 209 within a time window for a predetermined number of samples (i.e., radar returns) processed by the glint detector 212. In these embodiments, the glint detector 212 may perform an integration or a windowing operation over a predetermined integration or dwell time. In some embodiments, for each sample, the output 213 of the glint detector 212 may indicate when the off-boresight error estimates 211 exceed the variable threshold 209.

In some embodiments, the point-target determinator 250 may also include a monopulse variance estimator 216 to generate the measurement-variance estimates 217 from the SNR 205, and a point target classifier 218 to provide the measurement-variance estimates 217 to the target-state estimator 220 only when the Markov-chain counter 214 indicates that the target 104 is a point target. In these embodiments, the target 104 may be considered a point target when the output of the Markov-chain counter 214 does not exceed a predetermined number within a time window. Providing the measurement-variance estimates to the target-state estimator 220 allows the target-state estimator 220 to more accurately respond to target power fluctuations that reduce the SNR 105 of the return signals.

In accordance with some embodiments, the point target classifier 218 may be configured to refrain from providing the measurement-variance estimates 217 to the target-state estimator 220 when the Markov-chain counter 214 indicates the target 104 is not a point target. In these embodiments, the target 104 is not considered a point target when the output of the Markov-chain counter 214 exceeds a predetermined number within a time window. When the target 104 is not classified as a point target, it may be considered 'glinty' in which reflections from multiple scatterers (due to target features and shape) of the target 104 have become more significant.

The target-tracking radar 200 may also include a tracking controller 222 to provide tracking control signals 223 to control one or more antennas of the target-tracking radar 200. The target-state estimator 220 may calculate target position updates 221 for use by the tracking controller 222 to track the target 104 with the one or more antennas. In addition to target position updates 221, the target-state estimator 220 may also be configured to calculate target velocity and acceleration updates for the tracking controller 222. In some embodiments, the target-state estimator 220 may be a Kalman filter, although the scope of the embodiments is not limited in this respect.

In accordance with embodiments, when the target 104 is determined to be a point target by the point target classifier 218, the target-state estimator 220 may be configured use the measurement-variance estimates 217 to calculate the target position updates 221. When the target 104 is determined not to be a point target, the target-state estimator 220 may be configured to use at least one of filter residuals or a constant value for the measurement noise (e.g., estimated from the measurement-variance estimates 217) to calculate the target position updates 221.

In some embodiments, the measurement-variance estimates 217 may be the estimated boresight angle variance of the target 104 and may be calculated by the following equation:

$$\sigma_\theta = \frac{k}{\sqrt{SNR}}$$

in which k is a predetermined constant that may be based on antenna design and the SNR 105 may be estimated based on target power and a known or predetermined noise power. In these embodiments, the glint detector 212 may compare a total monopulse error (e.g., the off-boresight error estimates 211) to a variable threshold (i.e., variable threshold 209) and the glint exceedances are feed a Markov chain up/down counter (e.g., Markov-chain counter 214). This may provide a high probability of detecting when the target's returned energy represents a point target. This may be represented by the following equation $$\text{Glint Exceedance} = \begin{cases} 1 & |\varepsilon_{\theta measured}| > k_T \hat{\sigma}_\theta \\ 0 & \text{otherwise,} \end{cases}$$

$$\text{where } \sigma_\theta = \frac{k}{\sqrt{SNR}}$$

In this equation $$\sigma_\theta = \frac{k}{\sqrt{SNR}}$$

may represent the variable threshold 209 which may use a different constant k than the measurement-variance estimates 217 generated by the monopulse variance estimator 216.

In some embodiments, the target-tracking radar 200 may have a sufficiently high bandwidth, however unlike conventional high-bandwidth target-tracking radars, the target-tracking radar 200 may filter-out fluctuations in the off-boresight angles (as described above) for targets where maneuvers are not expected. In this way, the target-tracking radar 200 may achieve improved pointing performance, increasing the range at which targets can be engaged.

In accordance with some embodiments, the variance of each epsilon may be quantified as $\sigma^2=k^2/SNR$. If the target is small enough to be considered a point target, the data is used in real time to quantify the uncertainty of each radar measurement. The data may be provided to the target state estimator 220 to represent real-time measurement variance. Accordingly, susceptibility to a target's natural fluctuation in SNR is reduced.

Although the target-tracking radar 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements of the target-tracking radar 200 may refer to one or more processes operating on one or more processing elements.

Figure 3:
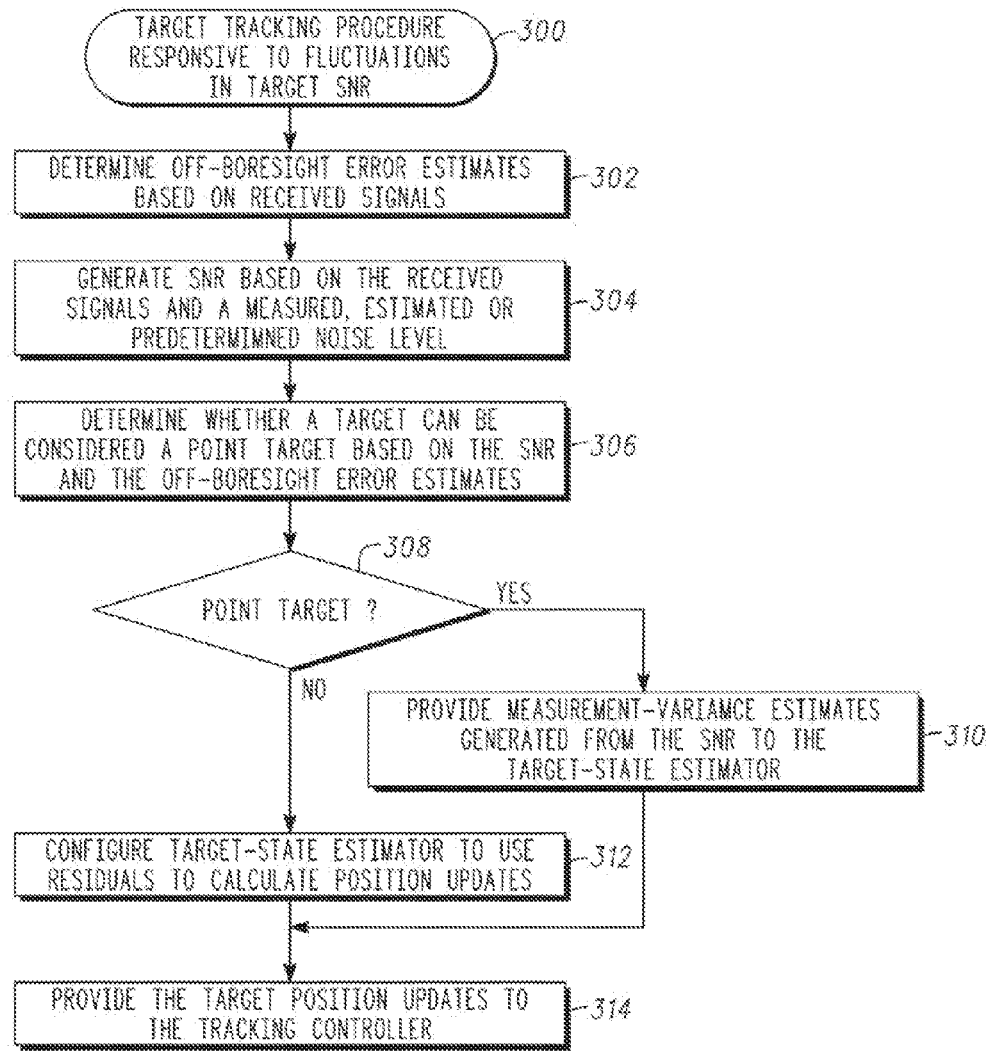
FIG. 3 is a flow chart of a target-tracking procedure in accordance with some embodiments.

FIG. 3 is a flow chart of a target-tracking procedure in accordance with some embodiments. The target-tracking procedure 300 may be performed by a target-tracking radar, such as target-tracking radar 200, although other configurations of target-tracking radars are also suitable.

In operation 302, off-boresight error estimates are determined based on received radar-return signals.

In operation 304, an SNR is generated based on the received signals and a measured, estimated or predetermined noise level.

Operation 306 determines whether a target can be considered a point target based on the SNR and the off-boresight error estimates.

When the target can be considered a point target, operation 308 causes operation 310 to be performed. When the target is not considered a point target, operation 308 causes operation 312 to be performed.

In operation 310, measurement-variance estimates generated from the SNR are provided to a target-state estimator and the target-state estimator may be configured to used measurement-variance estimates to calculate target position updates.

In operation 312, the target-state estimator may be configured to calculate target position updates without the use of the measurement-variance estimates.

In operation 314, the target-state estimator may be configured to provide the target position updates to a tracking controller.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the target-tracking radar 200 may include one or more processors and may be configured with instructions stored on a computer-readable storage device.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A target-tracking radar comprising point-target determinator configured to:
    determine whether a target can be considered a point target based on a signal-to-noise ratio (SNR) of received signals and off-boresight error estimates;
    provide measurement-variance estimates generated from the SNR to a target-state estimator when the target is determined to be a point target; and
    refrain from providing the measurement-variance estimates to the target-state estimator when the target is determined not to be a point target.

2. The target-tracking radar of claim 1 further comprising:
    processing circuitry to generate the SNR based on the received signals and one of a measured, estimated or predetermined noise level; and
    a monopulse error calculator to determine the off-boresight error estimates based on the received signals,
    wherein the received signals comprise a sum signal, an azimuth delta signal and an elevation delta signal.

3. The target-tracking radar of claim 1 wherein the point-target determinator comprises:
    a variable-threshold calculator to generate a variable threshold based on the SNR;
    a glint detector to compare the variable threshold with the off-boresight error estimates; and
    a Markov-chain counter to count a number of times that the off-boresight error estimates exceed the variable threshold based on an output from the glint detector.

4. The target-tracking of claim 3 wherein the output of the glint detector indicates when the off-boresight error estimates exceed the variable threshold.

5. The target-tracking radar of claim 3 wherein the point-target determinator further comprises:
    a monopulse variance estimator to generate the measurement-variance estimates from the SNR; and
    a point target classifier to provide the measurement-variance estimates to the target-state estimator when the Markov-chain counter indicates that the target is a point target.

6. The target-tracking radar of claim 5 wherein the point target classifier is further configured to refrain from providing the measurement-variance estimates to the target-state estimator when the Markov-chain counter indicates the target is not a point target.

7. The target-tracking radar of claim 5 further comprising a tracking controller to provide tracking control signals to control one or more antennas of the target-tracking radar,
wherein the target-state estimator is configured to calculate target position updates for use by the tracking controller to track the target with the one or more antennas.

8. The target-tracking radar of claim 7 wherein when the target is determined to be a point target, the target-state estimator is configured use the measurement-variance estimates to calculate the target position updates, and
wherein when the target is determined not to be a point target, the target-state estimator is configured to use residuals to calculate the target position updates.

9. The target-tracking radar of claim 8 wherein the target is a non-maneuvering target including one or a munition or a missile, and
wherein the target-tracking radar is configured to track a position of the target at range.

10. A method performed by a target-tracking radar for responding to fluctuations in target SNR for target tracking comprising:
determining, by a point-target determinator, whether a target can be considered a point target based on a signal-to-noise ratio (SNR) of received radar signals and off-boresight error estimates; and
providing, by the point-target determinator, measurement-variance estimates generated from the SNR to a target-state estimator when the target is determined to be a point target.

11. The method of claim 10 further comprising:
configuring the target-state estimator to use the measurement-variance estimates to generate target position updates.

12. The method of claim 11 further comprising:
refraining from providing the measurement-variance estimates to the target-state estimator when the target is determined not to be a point target; and
configuring the target-state estimator to use residuals to calculate the target position updates when the target is determined not to be a point target.

13. The method of claim 12 further comprising:
generating a variable threshold based on the SNR;
comparing the variable threshold with the off-boresight error estimates; and
counting a number of times that the off-boresight error estimates exceed the variable threshold based on the comparison of the variable threshold with the off-boresight error estimates.

14. The method of claim 13 further comprising:
generating the measurement-variance estimates from the SNR; and
providing the measurement-variance estimates to the target-state estimator when the counting indicates that the target is a point target.

15. A point target determinator comprising:
a variable-threshold calculator configured to generate a variable threshold based on a signal-to-noise ratio (SNR) of received radar signals;
a glint detector configured to compare the variable threshold with off-boresight error estimates;
a Markov-chain counter configured to count a number of times that the off-boresight error estimates exceed the variable threshold based on an output from the glint detector;

a monopulse variance estimator configured to generate measurement-variance estimates from the SNR; and
a point target classifier configured to provide the measurement-variance estimates to a target-state estimator based on an output of the Markov-chain counter indicating that the target is a point target.

16. The point target determinator of claim 15 wherein the output of the glint detector indicates when the off-boresight error estimates exceed the variable threshold, and
wherein the point target classifier is configured to refrain from providing the measurement-variance estimates to the target-state estimator when the target is determined not to be a point target.

17. The point-target determinator of claim 16 wherein when the target is determined to be a point target, the target-state estimator is configured to use the measurement-variance estimates to calculate the target position updates, and
wherein when the target is determined not to be a point target, the target-state estimator is configured to use filter residuals to calculate the target position updates.

18. A non-transitory computer-readable storage medium having instructions stored thereon which, when executed by one or more processors cause the one or more processors to determine whether a target is a point target by performing the following operations:
generating a variable threshold based on a signal-to-noise ratio (SNR) of received radar signals;
comparing the variable threshold with off-boresight error estimates;
counting a number of times that the off-boresight error estimates exceed the variable threshold based on an output from the comparing;
generating measurement-variance estimates from the SNR; and
providing the measurement-variance estimates to a target-state estimator based on an output of the counting indicating that the target is a point target.

19. The computer-readable storage medium of claim 18 wherein the instructions further configure the one or more processors to:
configure the target-state estimator to use the measurement-variance estimates to calculate the target position updates when the target is determined to be a point target; and
configure the target-state estimator to use residuals to calculate the target position updates when the target is determined not to be a point target.

20. A target-tracking radar comprising:
a point-target determinator;
a target-state estimator; and
a tracking controller configured to provide tracking control signals to control one or more antennas of the target-tracking radar,
wherein the target-state estimator is configured to calculate target position updates for use by the tracking controller to track the target with one or more antennas,
wherein the point-target determinator comprises:
a variable-threshold calculator configured to generate a variable threshold based on a signal-to-noise ratio (SNR) of received signals;
a glint detector configured to compare the variable threshold with off-boresight error estimates;
a Markov-chain counter configured to count a number of times that the off-boresight error estimates exceed the variable threshold based on an output from the glint detector;

a monopulse variance estimator configured to generate measurement-variance estimates from the SNR; and a point target classifier configured to provide the measurement-variance estimates to a target-state estimator based on an output of the Markov-chain counter indicating that the target is a point target, and wherein the output of the glint detector indicates when the off-boresight error estimates exceed the variable threshold, and wherein the point target classifier is configured to refrain from providing the measurement-variance estimates to the target-state estimator when the target is determined not to be a point target.

21. The target tracking radar of claim 20 wherein when the target is determined to be a point target, the target-state estimator is configured to use the measurement-variance estimates to calculate the target position updates, and wherein when the target is determined not to be a point target, the target-state estimator is configured to use filter residuals to calculate the target position updates.

* * * * *